United States Patent Office 3,793,327
Patented Feb. 19, 1974

3,793,327
α-2,9-DIFLUOROQUINACRIDONE
Edward E. Jaffe, Union, N.J., assignor to E. I. du Pont de Nemours and Company, Wilmington, Del.
No Drawing. Filed Feb. 4, 1972, Ser. No. 223,757
Int. Cl. C07d 39/00
U.S. Cl. 260—279    2 Claims

ABSTRACT OF THE DISCLOSURE

The compound 2,9-difluoroquinacridone is prepared in a novel polymorphic form (referred to herein as the "α" crystal form) characterized by an X-ray diffraction pattern exhibiting: lines of strong intensity with interplanar spacings of 5.90 A. and 3.24 A.; lines of intermediate intensity with interplanar spacings of 15.77 A., 6.46 A., 3.74 A.; and lines of weak intensity with interplanar spacings of 7.96 A., 5.27 A., 4.25 A., 3.97 A., 3.52 A. The compound is further characterized by a brilliant violet hue; hence, is well suited for pigmentary uses.

BACKGROUND

Among the commercially important organic pigments are those of the quinacridone series. Linear quinacridone and its substituted derivatives are readily produced by the techniques described in Struve U.S. Pats. 2,821,529 and 2,821,530, i.e. by a series of steps involving (1) the reaction of diethyl succinylsuccinate with aniline or its derivatives to produce a diethyl 2,5-diaryl amino-3,6-dihydroterephthalate, (2) ring closure of the latter to produce a 6,13-dihydroquinacridone, and (3) oxidation of the dihydro compound to the corresponding quinacridone. U.S. Pat. 2,821,529 states that the aniline derivative may be p-fluoroaniline, in which event the quinacridone so produced is 2,9-difluoroquinacridone of a brilliant magenta hue. This product, designated herein as the β crystal form, is characterized by an X-ray diffraction pattern exhibiting: lines of strong intensity with interplanar spacings of 14.97 A., 6.41 A., 3.33 A., and 3.21 A.; lines of intermediate intensity with interplanar spacings of 5.90 A., 3.93 A., and 3.57 A.; and lines of weak intensity with interplanar spacings of 7.42 A., 4.87 A., and 3.72 A. A specific disclosure of 2,9-difluoroquinacridone, which inherently is also of the β crystal form, is given in Cooper U.S. Pat. 3,107,248.

SUMMARY

In accordance with the invention it has been found possible to produce 2,9-difluoroquinacridone in a novel polymorphic form, the α crystal form, which is characterized by an X-ray diffraction pattern exhibiting: lines of strong intensity with interplanar spacings of 5.90 A. and 3.24 A.; lines of intermediate intensity with inter planar spacings of 15.77 A., 6.46 A., 3.74 A.; and lines of weak intensity with interplanar spacings of 7.96 A., 5.27 A., 4.25 A., 3.97 A., and 3.52 A. The compound is further characterized by a brilliant violet hue which provides a number of important advantages over the correponding β crystal product, which is characterized by a wholly different color and dissimilar X-ray diffraction pattern, as hereinbefore given.

Two preferred techniques have been developed leading to the novel α-2,9-difluoroquinacridone product of this invention and both involve the use of β-2,9-difluoroquinacridone as a starting material. In one embodiment, as will be illustrated in Example 1 hereinafter, crude β-2,9-difluoroquinacridone is milled, digested in an aqueous alkaline emulsion containing ortho-dichlorobenzene or nitrobenzene, recovered and treated in sulfuric acid, and recovered and washed. In an alternative embodiment, illustrated in Example 2, crude β-2,9-difluoroquinacridone or its purified counterpart obtained by the technique of acid crystallization is salt milled and treated with the aluminum salt of quinacridone disulfonic acid (the preparation of the disulfonic acid and its salts is given in Jaffe et al. U.S. Pat. 3,386,843).

Each of the above described techniques results in an essentially pure α-2,9-difluoroquinacridone product of a particle size reduced form, i.e. with an average particle size less than 0.2 micron as is needed for many pigmentary applications.

There is a particular advantage in the preparatory technique involving the utilization of the aluminum salt of quinacridone disulfonic acid. Thus the aluminum salt effectively serves to stabilize pigmentary α-2,9-difluoroquinacridone against any tendency to convert to the β crystal form. For this purpose the aluminum salt should be employed in an amount of 1 to 20% by weight based on the weight of pigment.

The α-2,9-difluoroquinacridone is characterized by a brilliant violet hue, by high tinctorial strength, by excellent lightfastness and by freedom from solubility in hydrocarbon solvents. Because of its distinct color, this polymorphic form makes a valuable pigment by itself and in blends with other pigments. Thus when 5 parts of the α-2,9-difluoroquinacridone product is incorporated with 95 parts TiO₂ (both on a weight basis) into an automotive paint composition, either as a 10% calcium Staybelite lake or as a toner using 6% ortho-carboxybenzamidomethylquinacridone, a finish is obtained which is substantially bluer than the widely used γ-quinacridone, is also bluer than β-2,9-difluoroquinacridone, and additionally is redder and more intense than the well known β-quinacridone. In a 62:38 weight ratio blend of α copper phthalocyanine with α-2,9-difluoroquinacridone, there results an approximation of the color of indanthrone, but one which excels in intensity. The product of this invention also forms intense reds when blended with molybdate orange. Useful products are also obtained from blends of the product of the invention with other quinacridone compounds or derivatives, e.g. α-quinacridone, γ-quinacridone, β-2,9-difluoroquinacridone, 2,9-dimethylquinacridone, etc. It may also be used to produce solid solutions with quinacridone or other quinacridone derivatives.

After 400 hours exposure in the Fade-O-Meter, paint compositions based on α-2,9-difluoroquinacridone pigment have been found to exhibit excellent lightfastness. Moreover when the pigment is flushed into lithographic varnish, it is found to be violet, intense in tint and blue in masstone relative to the corresponding β-phase product.

The following examples will further illustrate the invention. Parts and percentages are by weight unless otherwise stated.

EXAMPLE 1

(A) Preparation of crude 2,9-difluoroquinacridone

The compound 2,9-difluoro-6,13-dihydroquinacridone is prepared according to the procedure of Example II of U.S. Pat. 2,821,530 using p-fluoroaniline in lieu of the 3,4-dichloroaniline used in the prior art example. Oxidation of the dihydro compound is effected by the same general procedure described in that example. Thus 240 parts of the 2,9-difluoro-6,13-dihydroquinacridone is placed in a vessel, equipped with an agitator and a reflux condenser, along with 960 parts of methanol and a solution of 480 parts of potassium hydroxide in 420 parts of water. After stirring for 45 minutes at 50–60° C., 180 parts of sodium m-nitrobenzenesulfonate and 180 parts of water are added and the mixture heated at reflux for four hours. At the end of the heating cycle 250 parts of water are added and the solid separated by filtration followed by washing with water until alkali-free. A final drying step is effected at about 80° C. to give 229 parts (96.4% yield) of crude 2,9-difluoroquinacridone. Purification and analysis of this crude product as per Example 2(B), hereinafter, confirms that it is indeed the β crystal form of 2,9-difluoroquinacridone.

(B) Conversion of β-2,9-difluoroquinacridone to an α-crystalline product of a particle size reduced form Fifteen parts of crude β-2,9-difluoroquinacridone prepared according to Part A is charged to a ball mill together with 1500 parts of ½ inch steel balls and 150 parts of roofing nails. The charge is milled in a conventional manner at about 75% of critical speed for 90 hours, and the dry powdered product is then separated from the grinding elements. Four parts of the separated powder is then suspended in an emulsion consisting of 181 parts of water, one part of sodium hydroxide, 0.6 part of a surfactant (the isopropylamine salt of dodecylbenzene sulfonic acid) and 20.8 parts of ortho-dichlorobenzene. The mixture is stirred and refluxed for 12 hours, and the solvent is then allowed to distill out. Most of the solvent is effectively removed by this steam distillation process. The product is filtered and washed until free of base. The press cake is suspended in 275 parts of water mixed with 46 parts concentrated sulfuric acid, and the suspension stirred and boiled for one hour. The product is separated by filtration and washed free of acid. After drying, 3.8 parts of pigment are obtained. The product is confirmed to be pure α-2,9-difluoroquinacridone on the basis of an X-ray diffraction pattern exhibiting: lines of strong intensity with interplanar spacings of 5.90 A. and 3.24 A; lines of intermediate intensity with interplanar spacings of 15.77 A., 6.46 A., 3.74 A.; and lines of weak intensity with interplanar spacings of 7.96 A., 5.27 A., 4.25 A., 3.97 A., and 3.52 A.

EXAMPLE 2

(A) Purification of β-2,9-difluoroquinacridone

A portion of crude product as produced in Example 1(A) is powdered and then added to a large excess (more than 10 parts) of 100% sulfuric acid maintained below about 10° C. The mixture is stirred until solution is complete, at which time the calculated amount of water to reduce the concentration to about 85% sulfuric acid is added slowly. The temperature is maintained below 10° C. until most of the water has been added, but finally it is allowed to rise to about 30° C. At the concentration of about 85% acid, the sulfate of the quinacridone compound precipitates and is filtered off, washed with 80% sulfuric acid and finally hydrolyzed by introducing into a large excess of ice and water. The resulting product is filtered, washed acid-free, and dried to give about 92.4% recovery of purified material. A second purification of the same character gives about 97% recovery of a pigment which, by analysis, is found to be 2,9-difluoroquinacridone.

Calc. (percent): C, 69.00; H, 2.87; N, 8.04. Found (percent): C, 68.92; H, 2.92; N, 7.90.

An analysis using X-ray diffraction techniques indicates the 2,9-difluoroquinacridone is of the β crystal phase. The pattern is a follows: lines of strong intensity with interplanar spacings of 14.97 A., 6.41 A., 3.33 A. and 3.21 A.; lines of intermediate intensity with interplanar spacings of 5.90 A., 3.93 A., and 3.57 A.; and lines of weak intensity with interplanar spacings of 7.42 A., 4.87 A., and 3.72 A. The compound is magenta in hue.

Dissolving of 2,9-difluoroquinacridone in strong acids other than sulfuric acid, for example polyphosphoric acid, followed by precipitation due to dilution with water also yields the β phase.

(B) Conversion of β-2,9-difluoroquinacridone to an α-crystalline product of a particle size reduced form Into a steel lined ball mill of quart volume, there is introduced 15 grams of β-2,9-difluoroquinacridone prepared according to Part A, 135 grams of sodium chloride, 1500 grams of steel balls of ½ inch size, and 150 grams roofing nails. The mill is rolled for a period of 5 days at 75% of critical speed. The milled powder is then removed from the mill and separated from the grinding elements by means of a sieve. One-half of the powder is sifted into a stirred solution of one liter of water containing 25 milliliters concentrated $H_2SO_4$ and a quantity of quinacridone disulfonic acid in concentrated sulfuric acid sufficient to provide 3.03% quinacridone disulfonic acid based on the 2,9-difluoroquinacridone. After stirring for ½ hour at room temperature 5 grams of alum are added and the slurry boiled with open steam for ½ hour. The pigment is filtered and washed acid- and sulfate-free with water. The X-ray diffraction pattern confirms that it is essentially pure α-2,9-difluoroquinacridone. It contains about 3% of the aluminum salt of quinacridone disulfonic acid as a stabilizer.

If quinacridone disulfonic acid is omitted in this procedure, a pigmentary mixture of α and β-2,9-difluoroquinacridone results. While the mixture is also useful for pigmentary applications, its hue is intermediate that of the magenta β form and the violet α form.

What is claimed is:

1. The compound 2,9-difluoroquinacridone in a polymorphic form, designated as the α crystal form, which is characterized by an X-ray diffraction pattern exhibiting: lines of strong intensity with interplanar spacings of 5.90 A. and 3.24 A.; lines of intermediate intensity with interplanar spacings of 15.77 A., 6.46 A., 3.74 A.; and lines of weak intensity with interplanar spacings of 7.96 A., 5.27 A., 4.25 A., 3.97 A., and 3.52 A.

2. The compound of claim 1 in the form of a pigment, the particles of which have an average particle size less than 0.2 micron.

References Cited

UNITED STATES PATENTS

| | | | |
|---|---|---|---|
| 2,821,524 | 1/1958 | Struve | 260—279 R |
| 3,264,297 | 8/1966 | Streiff | 260—279 R |
| 3,298,847 | 1/1967 | Hanke | 260—279 R |
| 3,547,929 | 12/1970 | Wagener | 260—279 R |
| 3,686,009 | 8/1972 | West | 260—279 R |

DONALD G. DAUS, Primary Examiner

U.S. Cl. X.R.

106—288 Q; 260—270 R